(12) United States Patent
Khalidi et al.

(10) Patent No.: US 6,405,237 B1
(45) Date of Patent: Jun. 11, 2002

(54) METHOD AND APPARATUS FOR AN EFFICIENT DATA TRANSFER MECHANISM

(75) Inventors: Yousef A. Khalidi, Sunnyvale; Moti N. Thadani, Santa Clara, both of CA (US)

(73) Assignee: Sun Microsystems, Inc., Mountain View, CA (US)

(*) Notice: Subject to any disclaimer, the term of this patent is extended or adjusted under 35 U.S.C. 154(b) by 1187 days.

(21) Appl. No.: 08/780,790

(22) Filed: Jan. 9, 1997

Related U.S. Application Data (63) Continuation of application No. 08/321,133, filed on Oct. 11, 1994, now abandoned.

(51) Int. Cl.$^7$ .............................................. G06F 15/163
(52) U.S. Cl. .......................... 709/203; 709/231; 710/27
(58) Field of Search ............................. 395/200.3, 853; 709/203, 231; 710/27

(56) References Cited

U.S. PATENT DOCUMENTS

| | | | | |
|---|---|---|---|---|
| 4,823,259 A | * | 4/1989 | Aichelmann, Jr. et al. .. | 711/122 |
| 5,093,912 A | * | 3/1992 | Dong et al. .................. | 709/104 |
| 5,381,538 A | * | 1/1995 | Amini et al. ................ | 711/156 |

OTHER PUBLICATIONS

Druschel et al, Fbufs:A High–Bandwidth Cross–Domain Transfer Facility, U. Arizona, 14 pages, Dec. 1993.*

Thadani et al, An Efficient Zero–Copy I/O Framework for UNIX, pp. 1–17, May 1995.*

Druschel, Operating System Support for High–Speed Communication, pp. 41–51, Sep. 1996.*

"Computer Architectur News", M.S. Blumrich et al., vol. 22, No. 2, Apr. 1994, New York, pp 142–153.

"Computer", O. Krieger et al., vol. 27, No. 3, Mar. 1994, Long Beach, pp 75–82.

"Operating Systems Review (SIGOPS)", P. Druschel & L. Peterson, vol. 27, No. 5, Dec. 1993, New York, pp 189–202.

* cited by examiner

*Primary Examiner*—St. John Courtenay, III
(74) *Attorney, Agent, or Firm*—Blakely Sokoloff Taylor & Zafman

(57) ABSTRACT

A method and apparatus are described that permit an application to control data transfer from a memory object of a source device to a sink device. The application can request that an operating system establish a mapping between a fast buffer and a memory object storing the data. The operating system then establishes the mapping between the fast buffer and the memory object thereby permitting the application to direct that the data of the memory object be transferred to the sink device. Thus, the sink device can use direct memory access to the source device to transfer the data from the memory object. Furthermore, if the application modifies a portion of the data of the memory object prior to directing the transfer, only the modified portion of the data is copied to main memory prior to transfer to the sink device.

20 Claims, 4 Drawing Sheets

METHOD AND APPARATUS FOR AN EFFICIENT DATA TRANSFER MECHANISM

CROSS-REFERENCES TO RELATED APPLICATIONS

This is a continuation of a U.S. patent application (Application No. 08/321,133) filed Oct. 11, 1994, now abandoned.

BACKGROUND OF THE INVENTION

1. Field of the Invention

The present invention relates to the field of computer systems. More specifically, the present invention relates to data transfer among devices within a computer system.

2. Art Background

The input/output (I/O) subsystem is an area of operating systems (kernels) that traditionally has received less attention than other areas with respect to increasing speed and efficiency. In the past, I/O devices were slow compared to central processing unit (CPU) and memory speeds, the software demands on the I/O system were modest, and most machines were uniprocessors.

Today, the I/O subsystems of most operating systems do not exhibit the expected paradigm shift from that of the old systems even though many of the basic assumptions on which those I/O systems were built are no longer valid. For example, when an application reads data from a disk file and sends the data that was read to a network device, there is an assumption that the data will be modified by the application prior to being sent to the network device. This assumption is founded on a data processing paradigm wherein an application receives data as input, and then modifies the data, before providing the modified data as output. Therefore, in anticipation of the data being modified, the data to be transferred is copied from the disk file into a buffer where it can be modified. In the case of a video server, for example, this data processing paradigm will not apply when the video server application does not modify stored video data, but instead only directs that the stored video data be sent to a network device without modification of the data.

The advent of high-speed network media such as 100baseT Ethernet and ATM has served to focus the spotlight on the inefficiencies of existing I/O and buffer management frameworks. Data copying between an application and an operating system (kernel) represents a major overhead in this problem space.

The normal interface for an application to retrieve data from a peripheral device is to issue a system call to read the data. This read interface can be represented generically as: read (descriptor, buf, length), where the application presents a buffer, "buf", of size "length" bytes for the system to fill in from a device/file represented by the descriptor. Similarly, the normal interface used by an application to send data to a peripheral device is to issue a system call to write the data. This write interface can be represented generically as: write (descriptor, buf, length), where the application presents a buffer, "buf", of size "length" bytes to the system to be written out. The application can then reuse this buffer as soon as the write call returns. In the case of memory objects, such as files or frame buffers, the application can also map the object as being read/write to memory. The above interface typically requires a copy from the user buffer to the kernel/device buffer when writing, and requires a copy from the kernel/device buffer to the user buffer when reading.

An improvement on the normal read/write interface is to implement a fast buffer (fbuf) interface. A key aspect of the fbuf interface is the explicit exchange of buffers between the various domains (address spaces) that handle the data. Caching of buffers is implemented to take advantage of locality in interprocess communication. Once data has been exchanged between a set of domains, the buffer used is saved for other data exchanges within the same set of domains.

The fbuf read interface can be represented generically as: read2 (descriptor, buf, length), where the application requests data to be read, but does not provide the buffer. The buffer is then allocated instead by the system. Similarly, the fbuf write interface can be represented generically as: write2 (descriptor, buf, length), where the buffer presented by the application is surrendered to the system before the call returns. An example of an fbuf mechanism appears in: Fbufs: A High-Bandwidth Cross Domain Transfer Facility, Peter Druschel and Larry L. Peterson, 14th ACM Symposium on Operating Systems Principles, 1993.

The advantage of the fbuf interface is that it enables a zero-copy data transfer mechanism when reading from, or writing to, a character stream-device (a device that permits input and output of arbitrary strings of characters, examples of which are network interfaces and serial line devices).

A significant disadvantage of the fbuf interface, however, is that the fbuf interface still requires a copy when reading from, or writing to, a disk file. This copy requirement applies, for example, when an application is reading data from a disk file and sending the data read to a network device. An example of a system that uses such an application is a video server. Using a fast buffer to transfer data from a file to the network still requires copying the data from the kernel file buffer (or a user buffer mapped to the disk file) into the fast buffer to maintain the semantics of the read operation. Thus the prior art does not address the issues involved with optimizing reads from disk to the network.

SUMMARY OF THE INVENTION

A method and apparatus is described that permits an application to control data transfer from a memory object of a source device such as a disk, tape or network to a sink device such as a disk, tape or network. The application can request that an operating system establish a mapping or association for the purpose of data transfer between a fast buffer and a memory object storing the data. The operating system then establishes the mapping between the fast buffer and the memory object thereby permitting the application to direct that the data of the memory object be transferred to the sink device. The sink device can use (direct memory access to the source device to transfer the data from the memory object. Furthermore, if the application modifies a portion of the data of the memory object prior to directing the transfer, only the modified portion of the data is copied to main memory prior to transfer to the sink.

The mechanism described herein allows data to be transferred in a general purpose computing environment from a source to a sink without copying to main memory. This mechanism can operate within a general purpose operating system to provide a general mechanism that interoperates well with different devices, file systems and user applications. The transfer can be performed at the most efficient part of the system for a given source and destination. For example, if the source memory object represents a file and the destination is a network with both the network adapter and the disk adapter coupled onto the same I/O bus, a direct memory access (DMA) can be initiated directly from the disk adapter to the. network adapter without consuming any memory bandwidt. Previously, this operation would have required a transfer from the disk to kernel main memory, followed by a transfer from kernel memory to user buffers, then transferring data from the user buffers to the network device buffers, and then finally, transferring the data to the network.

BRIEF DESCRIPTION OF THE DRAWINGS

The features, and advantages of the method and apparatus of the present invention will be apparent from the following detailed description of the invention in which.

DETAILED DESCRIPTION OF THE INVENTION

In the following description, for purposes of explanation, specific numbers, materials and configurations are set forth in order to provide a thorough understanding of the present invention. It will be apparent to one skilled in the art, however, that the present invention may be practiced without the specific details. In other instances, well known systems are shown in diagrammatic or block diagram form in order not to obscure the present invention unnecessarily.

Figure 1:
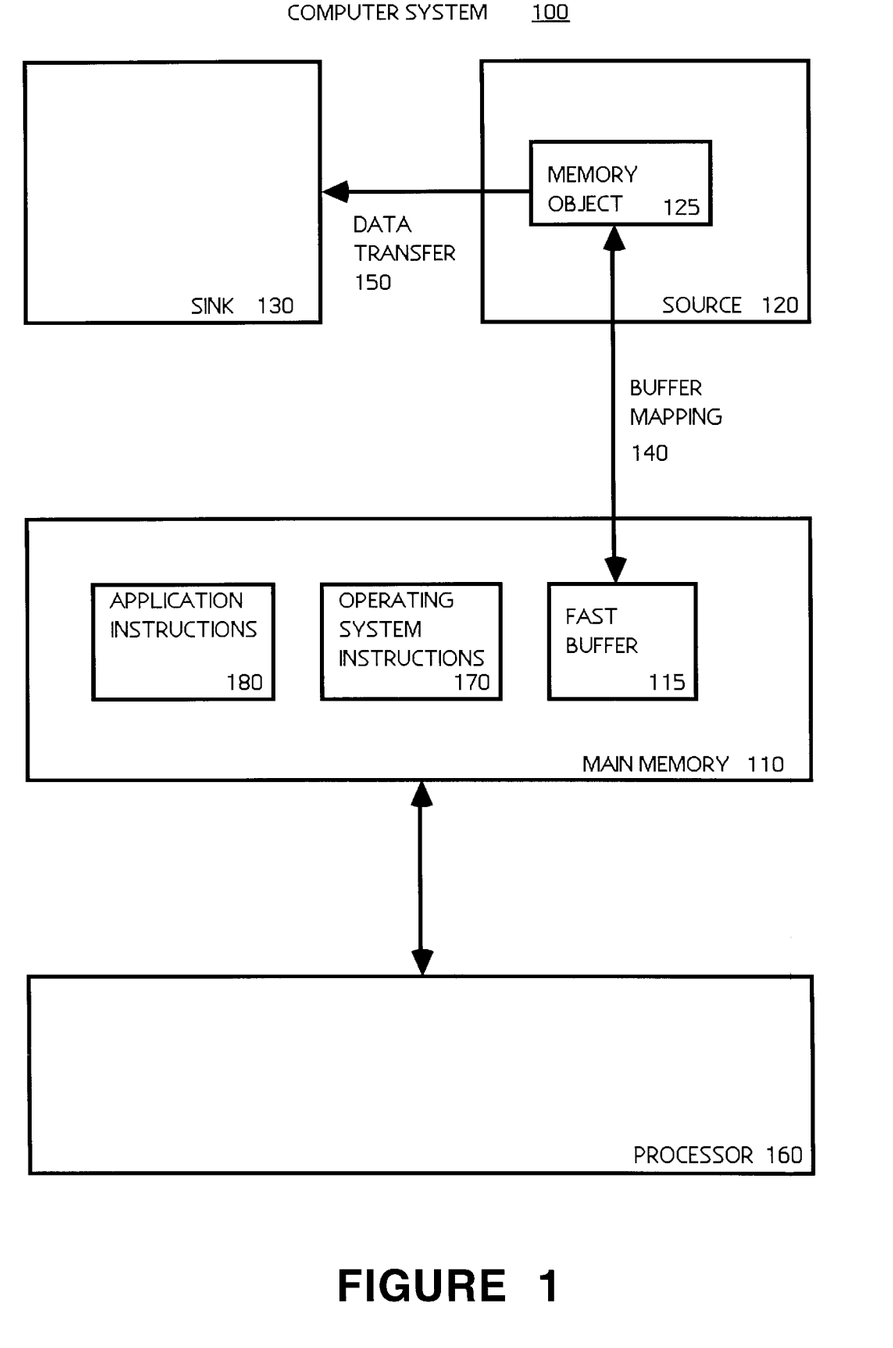
FIG. 1 illustrates a computer system that uses an embodiment of the present invention to perform data transfer by establishing a mapping between a memory object and a fast buffer within main memory.

Referring now to FIG. 1, a computer system is illustrated that uses an embodiment of the present invention to perform data transfer by establishing a mapping between a memory object and a fast buffer within main memory. In computer system 100, processor 160 can execute operating system instructions 170 and application instructions 180 that are stored in main memory 110. Alternately, operating system instructions 170 can be stored in a memory (not shown) that is separate from main memory 110. In such a case, the separate memory can either be random access memory (RAM) or can be read-only memory (ROM). Similarly, application instructions 180 can also be stored in a RAM or ROM that is separate from main memory 110.

In computer system 100, buffer mapping 140 is established between memory object 125 of source device 120 and fast buffer 115 of main memory 110. Data transfer 150 can then be made directly from source device 120 to sink device 130.

Source device 120 can be any device having a memory object to which a mapping can be established For one embodiment source 120 is a disk drive. Alternately, source 120 is a tape drive. In yet another embodiment source 120 is a character stream device (e.g., network interface).

Similarly, sink device 130 can be any device to which data can be sent. For one embodiment, sink 130 is a stream-like device (e.g., network interface). Alternately, sink device 130 can be a disk or tape drive.

For the special case wherein a transfer is being performed from a character stream source 120 to a mapped file sink 130, in which the fast buffers are created from the mapped file, care must be exercised. The data order must be maintained between the source 120 and sink 130. For example, this ordering can be ensured by employing a network protocol that maintains ordering of the data on the sender, the network medium and the receiver.

The present invention includes an interface that allows data to be transferred in a general purpose computing environment from disk to the network without copying. This interface can operate within a general purpose operating system to provide a general interface that interoperates well with different devices and user applications.

The semantics of a read call, be it a read or read2, requires that the data be returned in a buffer. When one wants to read the data from disk and send the data out to the network without (usually) manipulating the data, a more efficient transfer mechanism can be attained if one first establishes a mapping to the data. This special mapping returns a buffer that is mapped (but not filled) in from a memory object (e.g., a file). If the data are needed before being consumed by a write2 operation, a copy is made as usual when the application touches the memory mapped buffer. No copy is made, however, if the buffer is written out using a write2 operation. Moreover, optimizations are possible such that the actual bits are transferred from the disk to the network using the most efficient part of the hardware I/O-memory hierarchy (e.g., as a direct memory access (DMA) from one device to another).

Note that simply using a standard map call (e.g., a mmap call in UNIX) will not permit this transfer to be made. This is because a standard map call establishes a mapping. between a memory object and application buffers. A write2 call, however, requires a special buffer. Thus, a standard map call does not establish the mapping between the memory object and the fast buffer that is required by a write2 call.

For one embodiment the following system call is defined:

mmap2 (descriptor, offset, addr, length, protections, flags).

The mmap2 call maps the memory object represented by the descriptor, for the length specified at the offset from the beginning of the memory object specified, using the protections indicated in the call. The call returns a buffer mapped at the address "addr."

If the application touches (part of) the memory mapped buffer, the system copies the data from the memory object to physical memory. Note that only those pages touched will be copied.

Figure 2:
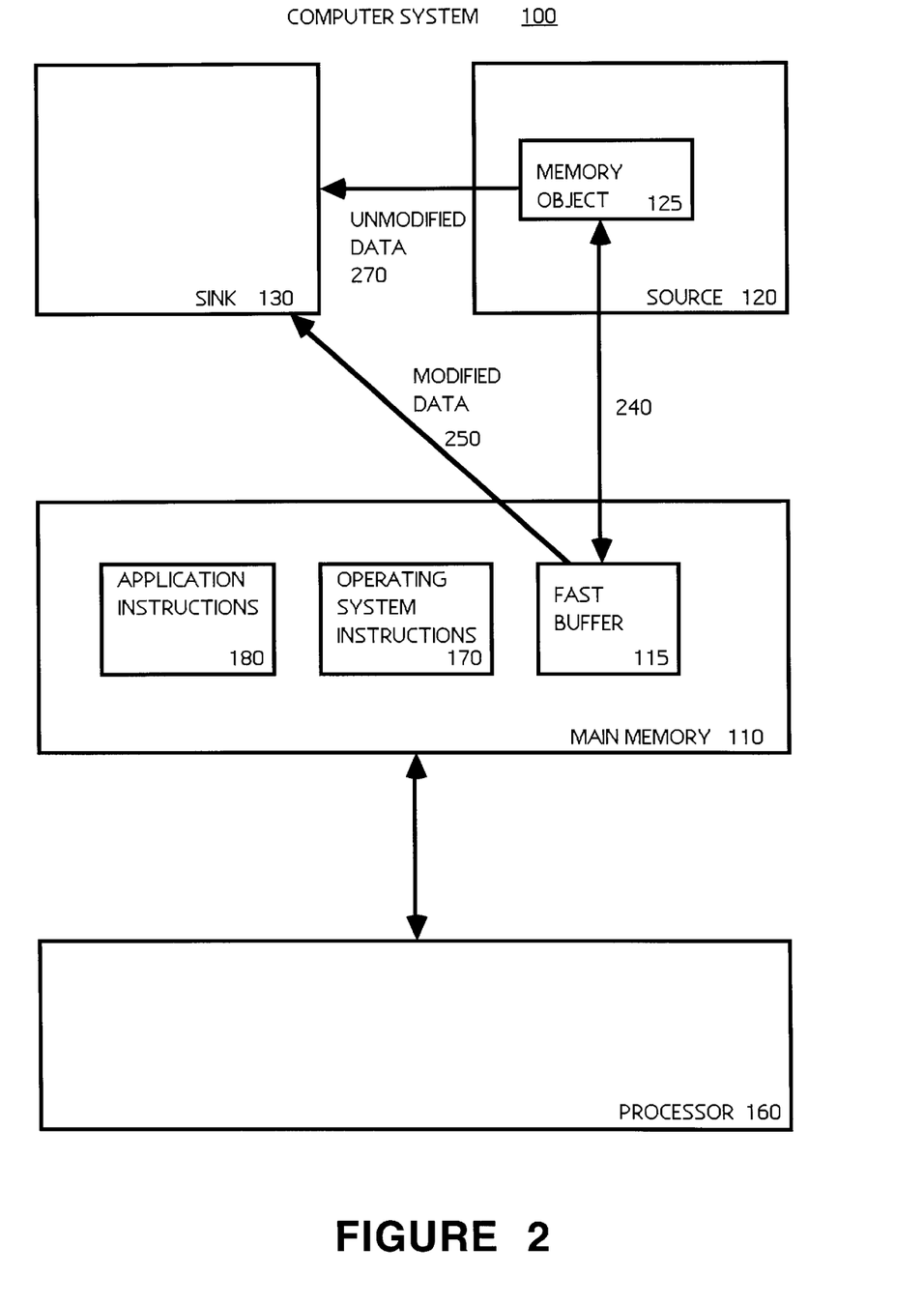
FIG. 2 illustrates a data transfer case wherein a copy to the kernel buffer is required due to data modification by the application prior to the transfer.

FIG. 2 illustrates a data transfer case wherein a copy to the kernel buffer is required due to data modification by the application prior to the transfer. In FIG. 2, portions of memory object 125 to be modified are transferred (240) to fast buffer 115. The modified data 250 are then transferred to sink 130. Unmodified data 270 can be transferred directly from memory object 125 of source 120 to sink 130.

The buffer returned from mmap2 can be treated the same as a buffer returned from read2. Therefore, this buffer can then be written out using the write2 call described before. As with any buffer given to write2, the buffer is surrendered to the system as soon as the write2 call returns.

For one implementation of write2, a check is made to determine whether this buffer was obtained using an mmap2 call. If so, then the data is transferred from the source memory object to the destination device (where the destination device is indicated by the descriptor specified to the write2 call).

This transfer can be performed at the most efficient part of the hardware memory system/bus, given the particular source and destination. So for example, if the source memory object represents a file and the destination is a network, and both the network adapter and the disk adapter are connected on the same I/O bus, a direct memory access (DMA) can be initiated directly from the disk adapter to the network adapter, without consuming any memory bandwidth. This feature can be exploited in more sophisticated hardware organizations. Previously, a transfer from the disk to main memory, followed by a transfer from main memory to the network, would have been required.

For an alternative embodiment, a mapping_to_buf operation is defined. For this embodiment, the call mapping_to_buf is applied to a memory mapped area returned by the normal system mmap call. Although such an operation can be useful in general, this alternative embodiment is more costly than the previous embodiment because two calls are required to obtain a buffer (mmap followed by mapping_to_buf, instead of a single mmap2 call). In addition, when a single mmap2 call is used, the semantic information conveyed by the call enables the implementation to optimize the mapping to produce a buffer, whereas using two calls delays conveying this information until the second call.

Thus the mechanism presented herein permits one to perform a zero-copy efficient data transfer from disk to network, while retaining the flexibility of a general purpose operating system. All calls used are applicable to other parts of the I/O system and can be used by any user application. The solution is not limited to the kernel, nor is it limited to specialized applications or devices.

The transfer between the disk and the network can be performed using the most efficient part of the computer system. This is achievable because the combination of mmap2 followed by write2 provide two things: a fast buffer mapped to the file, followed by a write that does not require a copy. Therefore, the point at which data transfer from the source disk to the destination network occurs can be delayed until the most opportune moment.

Although the transfer mechanism is independent of a particular operating system, the following example embodiment will describe an efficient zero copy framework for buffer management and exchange between application programs and the UNIX kernel. An application programming interface is presented along with a discussion of the underlying buffer management framework and its integration with high-speed networking software. The virtual fast buffer mechanism presented moves beyond concern over network throughput to address the combination of file system and network I/O. The framework can be implemented in a general purpose, commercial, UNIX-based OS such as Solaris to reduce data touching overheads of typical UNIX I/O operations (e.g., layer processing, computing checksums, data movement). The improvements are highly visible in applications that require large amounts of data transfer at very high speeds such as networked/distributed multimedia systems.

The name virtual fast buffer (virtual fbuf) is used to distinguish the transfer mechanism described herein from the traditional fast buffer mechanism. A new application programming interface is discussed along with the underlying buffer management framework and its integration with the networking implementation in UNIX. In addition, the basic fbuf mechanism is extended to include file (disk) I/O.

The traditional UNIX read/write system call semantics implicitly require a data copy rather than a transfer of buffers. The syntax of the traditional UNIX read interface is insufficient for the transfer of buffers from the kernel to an application because it requires the application program to supply the address of the buffer. The virtual fbuf mechanism adapts the concept to the UNIX environment by defining a new application programming interface that addresses these shortcomings.

The following properties of virtual fbufs are noted:

Each virtual fbuf is either owned by an application program or the kernel or is in the virtual fbuf buffer pool.

By passing a virtual fbuf (rather than an arbitrary buffer) to the kernel on output, the application is guaranteed a saving in data copying overhead implicit in the definition of the traditional write system call.

Similarly, by receiving data in a virtual fbuf (rather than an arbitrary buffer) from the kernel on input, the application is guaranteed a saving in data copying overhead of the traditional read system call.

The I/O subsystem (device drivers, STREAMS modules/drivers (see "AT&T Streams Reference", AT&T, 1990), file systems) can allocate virtual fbufs. Note that for optimal use, the I/O subsystem is able to determine the correct buffer pool to use either before initiating input as in the case of disk or tape I/O or by examining some part of the data received as in the case of network or serial line I/O.

Caching of translations between kernel addresses and I/O addresses in various device drivers is facilitated by a small pool size and the resulting re-usage of fbufs as compared with arbitrary buffers in each application address space. Such caching can result in additional savings in overhead.

The virtual fbuf mechanism enhances the fbuf concept by implementing the fast buffers as the 5-tuples <context, user-address, device, offset, length>instead of using memory references. The memory to hold the contents of the buffer is allocated only when the contents are accessed, not necessarily when the buffer is allocated nor when the buffer is passed between address spaces (domains). This distinction provides greater power and flexibility to the fbufs framework because the representation can be the foundation for a lazy evaluation of I/O One example is the possibility of building dynamic couplings between I/O devices. In such a scenario, these buffers are used in conjunction with a high performance hardware configuration to make application controlled device-to-device data transfer possible through the UNIX file system.

The original fbufs concept is extended to memory mapped files by providing an interface that automatically creates virtual fbufs from portions of application address spaces that are mapped to UNIX files using the <context, user-address, device, offset, length>5-tuple representation of the fbufs.

The virtual fbufs application programming interface provides system calls and library routines to allocate buffers, read data from a file (device) descriptor and write data to a file (device) descriptor. The following interfaces are defined using the standard ANSI C language syntax. Note that vf_read, vf_write and vf_map correspond respectively to read2, write2 and mmap2.

| | |
|---|---|
| ssize_t vf_read | (int fd, void**bufpp, size_t nbytes) |
| ssize_t vf_write | (int fd, const void*bufp, size_t nbytes) |
| caddr_t vf_mmap | (caddr_t addr, size_t len, int prot, int flags, int filedes, off_t off) |

| | |
|---|---|
| void *vf_allocate | (size_t size) |
| void *vf_deallocate | (void *ptr, size_t size) |

Applications that read data and process the data or discard it can use the vf_read interface. Applications that read, optionally filter the data and write the (filtered) data can use the vf_read interface or can use vf_mmap followed by vf_write. Applications that generate data and then write the data generated can use the vf_allocate interface, followed by vf_write and vf_deallocate.

The vf_read interface is similar to a standard UNIX read interface except that it reads data into a new buffer allocated by the kernel at an address *bufpp also allocated by the kernel.

The vf_write interface is similar to the standard UNIX write interface, except for the following salient points:

1. The buffer at address bufp is transferred to the operating system after the call returns; from the perspective of the application it is as if an implicit vf_deallocate occurs after the call returns. The result of attempting to access or modify the buffer *bufp after the call returns is undefined.

2. The buffer at address bufp must have been allocated either
   (a) explicitly by a call to
      bufp=vf_allocate (size); or
   (b) implicitly by calling
      size=vf_read (fd, &bufp, nbytes); or
   (c) by reference to a buffer within a range of the user address space mapped to some other file, filedes, by using the vf_mmap call
      bufp=vf_mmap (addr, len, prot, flags, filedes, off)+offset;
      where offset is less than len.

The vf_mmap interface is similar to the standard UNIX mmap. It has the additional property, however, that any part of the user address range mapped to the file is usable in an vf_write call and will be treated as a virtual fbuf. The vf_allocate interface is a virtual fbuf allocator. The vf_deallocate interface is the complement of vf_allocate. It deallocates a virtual fbuf.

The buffer allocation mechanism vf_allocate may fail, with error code ENOMEM, even when there is ample space in the process virtual address space. The application can be written to deal with such failures by retrying the failed call until it succeeds (or fails for a different reason). Alternately one can encapsulate the calls described above into a library that reverts to the standard read/write interface when any failure occurs, thereby making failure handling transparent to the application writer.

The virtual fbuf mechanism also provides the following kernel hooks for the I/O subsystem to allocate and free a virtual fbuf.

| | |
|---|---|
| void *vf_pid2handle | (pid_t pid, caddr_t) |
| mblk_t *vf_allocb | (void *handle, int size) |

The vf_pid2handle interface returns an opaque handle to be used for a virtual fbuf allocation by an I/O subsystem for I/O on behalf of the process identified by the pid parameter. A NULL valued handle is returned when a virtual fbuf buffer pool does not exist for the process identified by pid.

The vf_allocb interface allocates and returns a pointer to a virtual fbuf based mblk_t. The interface is similar to the STREAMS routine allocb except for the handle parameter that specifies from which virtual fbuf buffer pool the mblk_t should be allocated. If a mblk_t cannot be allocated from the virtual fbuf buffer pool, the mblk_t is allocated using allocb. A NULL return indicates that an mblk_t could not be allocated. A virtual fbuf based mblk_t can be deallocated or returned to the buffer pool by use of the STREAMS routine freeb.

Figure 3:
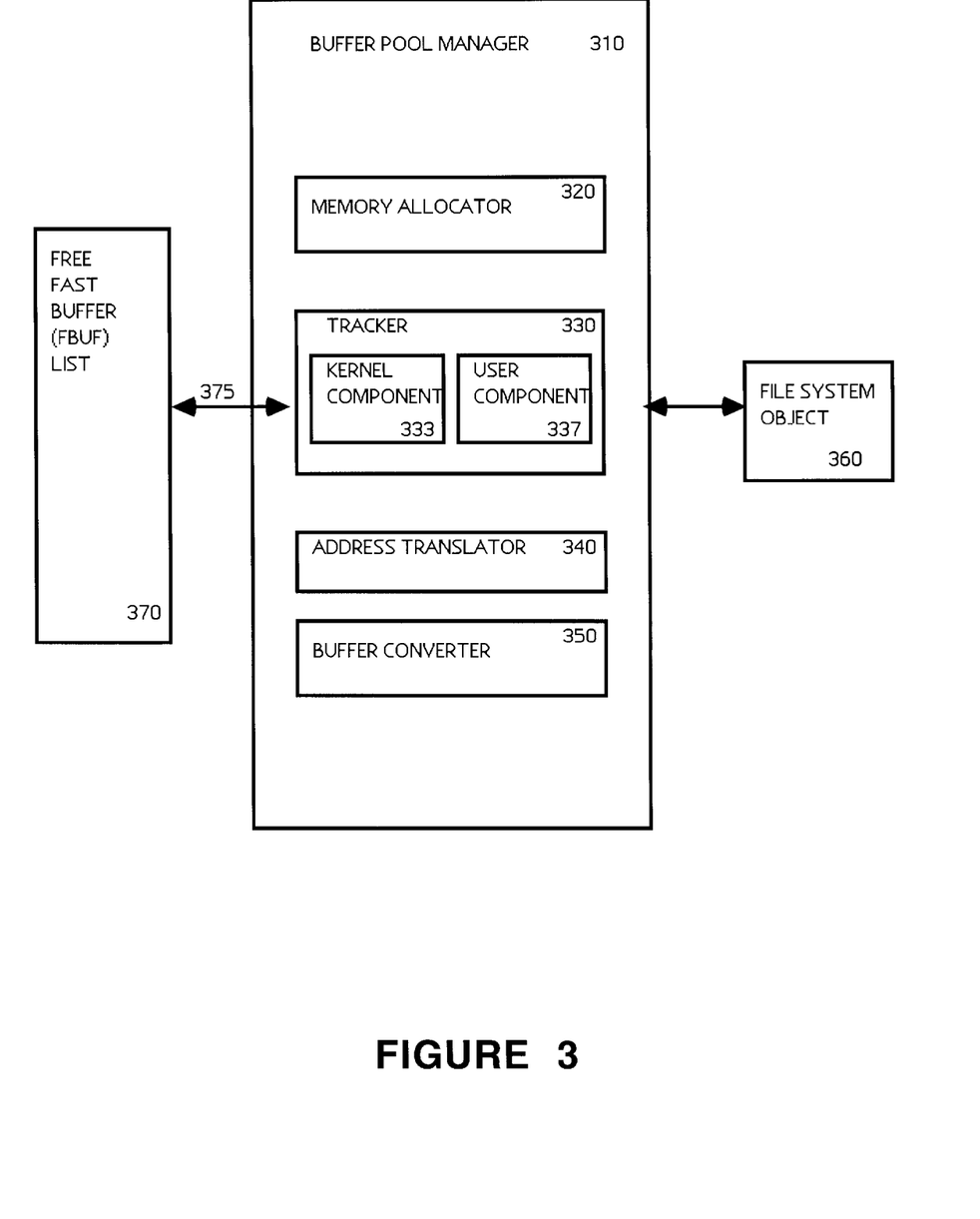
FIG. 3 illustrates a buffer pool manager for one embodiment of the transfer mechanism.
Figure 4:
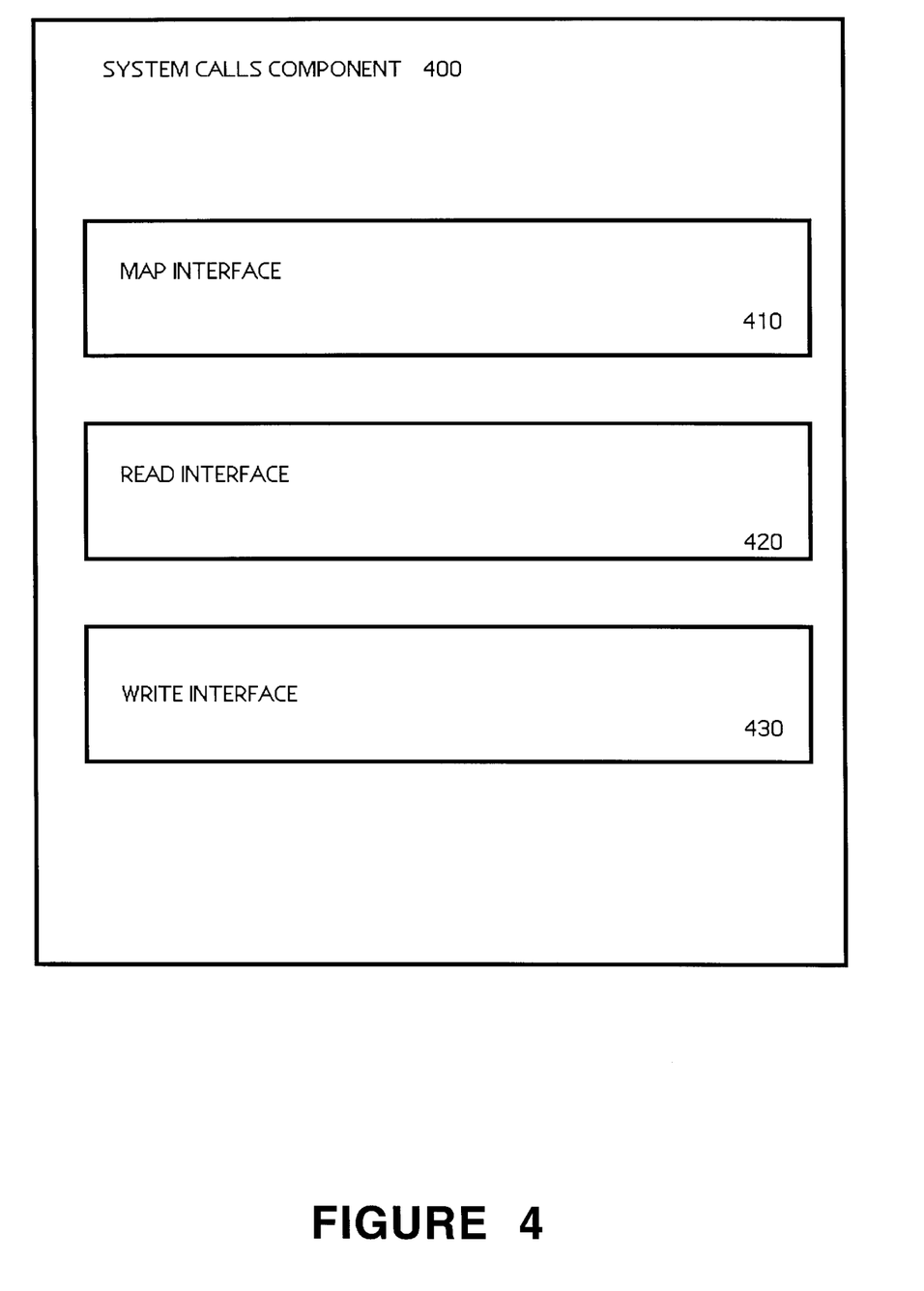
FIG. 4 illustrates mapping, reading and writing interfaces within a system calls component for one embodiment of the transfer mechanism.

The implementation is logically divided into a buffer pool manager (FIG. 3) and a system calls component (FIG. 4).

FIG. 3 illustrates a buffer pool manager for one embodiment of the transfer mechanism. Each application program that uses virtual fbuf buffers is associated with a different instance of the buffer pool manager 310. Buffer pool manager 310 is responsible for allocation of memory, tracking allocation/deallocation of each individual virtual fbuf, managing mappings between user and kernel addresses and providing mechanisms to convert between fbufs and buffers of existing I/O frameworks (e.g., mblks used by the STREAMS framework). These functions are accomplished respectively by memory allocator 320, tracker 330, address translator 340 and buffer converter 350.

Each buffer pool is composed of a number of segments. A segment represents a contiguous range of user addresses that is backed by a file system object 360 capable of supporting the standard mmap interface. The buffer pool manager 310 is itself a special instance of such a file system object and is the supplier of anonymous memory. The allocation of physical memory is deferred until the latest possible moment, until either the application program accesses an fbuf (causing a page fault) or the application transfers an fbuf to the kernel or an I/O subsystem allocates a fbuf from the pool. The allocation is performed in units of blocks, the size of a block being a tunable parameter.

The simultaneous allocation and deallocation of fbufs from the kernel and the application program is supported. To make this possible, the tracker 330 of buffer manager 310 has a kernel allocator/deallocator component 333 and a user library allocator/deallocator component 337. In both domains the allocator/deallocator components access and manipulate a list of free fbufs 370. The free list 370 is thereby kept consistent and the manipulations are kept atomic with respect to the two domains.

For one embodiment, free list 370 is implemented as a bit string in which a-., one represents a free page and a zero represents an allocated page. The string is accessed in units of words (using the native word size of the architecture), each of which contains page bits. A spin lock protects access to each word to manage concurrent access. The lock on each word is held only for a few instructions (enough to determine that sufficient free pages exist to satisfy an allocation request or to set the bits that represent the pages being freed), thus spinning while the lock is held is performed.

Note that for this embodiment it is possible for an application program to be preempted while holding the lock thereby creating a potential performance problem. Therefore the kernel allocator fails after a tunable number of iterations on the bitmap string. Similarly, the kernel deallocator queues deallocations on an internal queue if it fails to acquire the appropriate lock within the tunable number of iterations and attempts the deallocation at a later point.

In the general case, the user and kernel addresses of the buffer will be different. Address translator 340 of buffer manager 310 maintains the mappings and makes it possible to determine one from the other.

In addition to the address translation, the buffer manager 310 also provides mechanism 350 to convert between fbufs and buffers of existing I/O frameworks (e.g., mblks used by the STREAMS framework). This conversion facility makes it easy to integrate each fbuf with existing I/O drivers, network protocol stacks, and the like.

The buffer manager 310 is implemented as a dynamically loaded device driver. The system call component is dynamically loaded. These two components are all that is required to provide fbuf capability to a Solaris system. FIG. 4 illustrates mapping 410, reading 420 and writing 430 interfaces within system calls component 400 for one embodiment of the transfer mechanism.

The system calls as implemented have some restrictions such that the buffer must not be modified by the application after the call returns. In general, the I/O subsystem and the operating system will not enforce this discipline. If the restrictions on the buffer are not met, the implementation of vf_write will reduce to the standard write call followed by a vf_deallocate.

For one embodiment, the virtual fbuf pool is partitioned by process id to ensure that sharing occurs only between individual applications and the kernel, not between any arbitrary applications.

While the method and apparatus of the present invention has been described in terms of its presently preferred and alternate embodiments, those skilled in the art will recognize that the present invention may be practiced with modification and alternation within the spirit and scope of the appended claims. The specifications and drawings are, accordingly, to be regarded in an illustrative rather than a restrictive sense.

What is claimed is:

1. A method for controlling data transfer, the method comprising the steps of:
   (A) requesting by an application that an operating system establish an association for purposes of data transfer between a fast buffer and a memory object storing the data on a source device;
   (B) establishing by the operating system the association between the fast buffer and the memory object; and,
   (C) directing by the application that the data of the memory object associated with the fast buffer be transferred to a sink device via a first data path without copying any portion of the data to main memory unless the application attempts to access via a memory fetch/store, any portion of the transferring data.

2. The method as set forth in claim 1 wherein step (A) comprises the steps of:
   (A1) requesting a UNIX mmap call for the memory object by the application; and
   (A2) requesting by the application that the memory object association be extended to the fast buffer.

3. The method as set forth in claim 1 further comprising the step of:
   issuing by the sink device a direct data transfer to the source device to transfer the data from the memory object.

4. The method as set forth in claim 1 further comprising the step of:
   copying the data to main memory prior to transfer to the sink device along a second data path when the application modifies the data of the memory object prior to step (C).

5. The method as set forth in claim 1 further comprising the step of:
   copying only the modified portion of the data to main memory prior to transfer to the sink device when the portion of the data of the memory object is modified prior to step (C).

6. An apparatus for controlling data transfer, the apparatus comprising:
   a mapping requester adapted to permit an application to request that an operating system establish an association for the purposes of data transfer between a fast buffer and a memory object storing data on a source device;
   a mapper adapted to permit the operating system to establishing the association between the memory object and the fast buffer; and
   a writer adapted to permit the application to direct that the data of the memory object associated with the fast buffer be transferred to a sink device along a first data path without copying the data into main memory along a second data path unless the application attempts to access via a memory fetch/store, any portion of the transferring data.

7. The apparatus as set forth in claim 6 wherein the mapping requester comprises:
   a memory mapper to permit the application to request a UNIX mmap call for the memory object; and
   a fast buffer mapper to permit the application to request that the UNIX mmap call be extended to the fast buffer.

8. The apparatus as set forth in claim 6 further comprising:
   a direct memory accesser adapted to permit the sink device to use direct memory access to the source device to transfer the data from the memory object.

9. The apparatus as set forth in claim 6 further comprising the steps of:
   a copier adapted to detect when the application modifies the data of the memory object prior to directing that the data of the memory object be transferred to the sink device and if the application modifies the data, to copy the data to main memory prior to transfer to the sink device.

10. The apparatus as set forth in claim 6 further comprising:
    a copier adapted to detect when the application attempts to access via memory fetch/store any portion of the data of the memory object prior to directing that the data of the memory object be transferred to the sink device, and if the application modifies the data, to copy only the portion of the data modified to the main memory prior to transfer to the sink device.

11. The apparatus as set forth in claim 6 wherein the source device is one of a disk drive and a tape drive.

12. The apparatus as set forth in claim 11 wherein the sink device is a network.

13. The apparatus as set forth in claim 6 wherein the source device is a network.

14. The apparatus as set forth in claim 13 wherein the sink device is one of a disk drive and a tape drive.

15. A method for providing an apparatus for controlling data transfer, the method comprising the steps of:
    providing a system calls component that will permit an application to specify that a fast buffer be associated to a memory object storing data on a source device for purposes of data transfer, said system call components permitting the application to specify that the data be transferred from the source device to a sink device along a first data path without copying the data to main memory along a second data path; and
    providing a buffer pool manager that will effect the association of the memory object to the fast buffer at the behest of the system calls component.

16. The method as set forth in claim 15 wherein the system calls component further comprises:
- a mapping interface adapted to direct the buffer pool manager to establish an association between the memory object and the fast buffer; and
- a writing interface adapted to direct that the data of the memory object associated with the fast buffer be transferred to a sink device at the behest of the application.

17. The method as set forth in claim 15 wherein the buffer pool manager comprises:
- a memory allocator to allocate physical memory to the fast buffer, the allocator adapted to delay allocation until the application accesses the fast buffer or until the application transfers the fast buffer to an operating system or until an input/output subsystem allocates the fast buffer;
- a tracker to track allocation and deallocation of the fast buffer;
- an address translator to translate a user address to a kernel address and to translate the kernel address to the user address; and
- a converter to convert the fast buffer to an input/output buffer of the sink device.

18. The method as set forth in claim 17 wherein the tracker comprises:
- a kernel tracker to track allocation and deallocation of the fast buffer for the operating system; and
- a user library tracker to track allocation and deallocation of the fast buffer for the application, the kernel and user library trackers being adapted to permit simultaneous allocation and deallocation of the fast buffer by the application and the operating system.

19. A method for controlling data transfer to a sink device, from a source device having a memory object that is storing data, in a computer system having application and operating system instructions stored in main memory, the method comprising the steps of:
- requesting by the application that the operating system establish an association for purposes of data transfer between a fast buffer and the memory object;
- establishing by the operating system the association between the fast buffer and the memory object; and
- directing by the application that the data of the memory object associated with the fast buffer be transferred to the sink device without storing the data in the main memory during transfer.

20. An apparatus for controlling data transfer to a sink device, from a source device having a memory object that is storing data, in a computer system having application and operating system instructions stored in main memory, the apparatus comprising:
- a mapping requester for permitting the application to request that the operating system establish an association for purposes of data transfer between a fast buffer and the memory object;
- a mapper for permitting the operating system to establishing the association between the memory object and the fast buffer; and
- a writer for permitting the application to direct that the data of the memory object associated with the fast buffer be transferred to the sink device without storing the data in main memory during transfer.

* * * * *